O. D. PEDEN.
STALK CUTTER.
APPLICATION FILED APR. 2, 1921.

1,429,163.

Patented Sept. 12, 1922.
2 SHEETS—SHEET 1.

O. D. Peden.
INVENTOR

BY *Victor J. Evans*
ATTORNEY

WITNESS:

O. D. PEDEN.
STALK CUTTER.
APPLICATION FILED APR. 2, 1921.
1,429,163.
Patented Sept. 12, 1922.
2 SHEETS—SHEET 2.
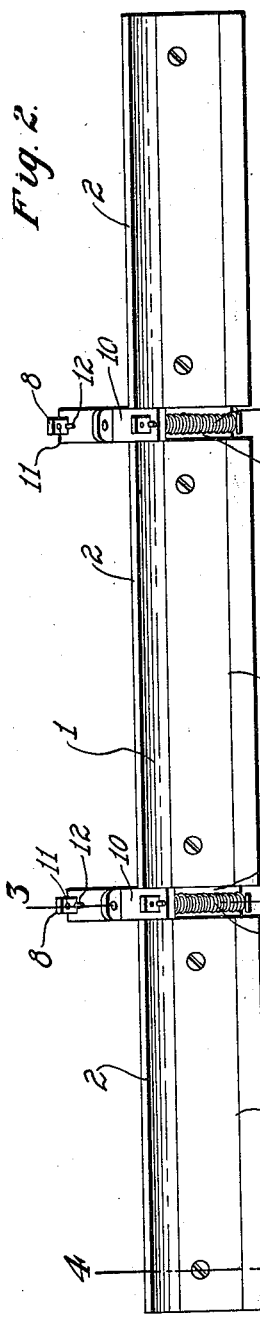
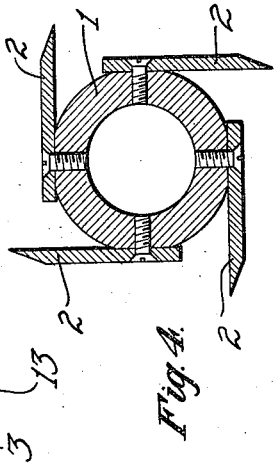
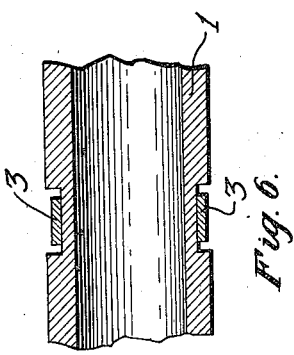
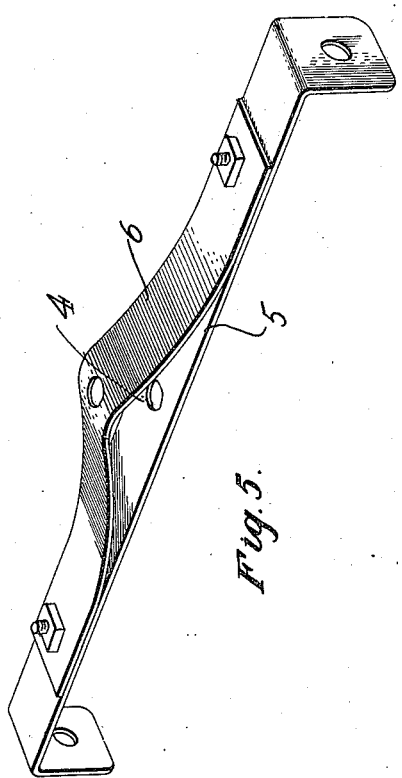
O. D. Peden.
INVENTOR Patented Sept. 12, 1922.

1,429,163

UNITED STATES PATENT OFFICE.

OREAL D. PEDEN, OF ROSCOE, TEXAS.

STALK CUTTER.

Application filed April 2, 1921. Serial No. 458,109.

*To all whom it may concern:*

Be it known that I, OREAL D. PEDEN, a citizen of the United States, residing at Roscoe, in the county of Nolan and State of Texas, have invented new and useful Improvements in Stalk Cutters, of which the following is a specification.

This invention relates to means for cutting corn stalks and the like, the principal object of the invention being to provide a device of this nature which may be attached to an agricultural implement, such as a planter, so that it can be drawn across a field to cut the stalks and the like thereon so that the same can be easily plowed under.

Another object of the invention is to provide spring means for holding the cutting members against the ground so that they will engage the stalks with a certain amount of pressure and thus be caused to cut the same.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a front view of the attachment itself.

Figure 4 is a section on line 4—4 of Figure 2.

Figure 5 is a perspective view of the lower supporting frame for the cutter.

Figure 6 is a section on line 6—6 of Figure 3.

Figure 1:
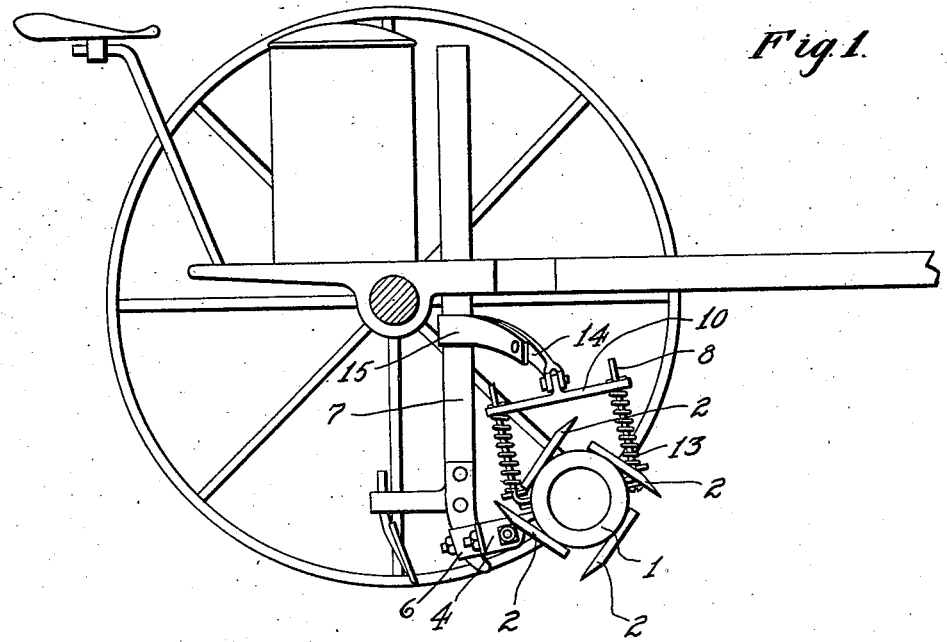
Figure 1 is a side elevation of my invention applied to a planter.
Figure 3:
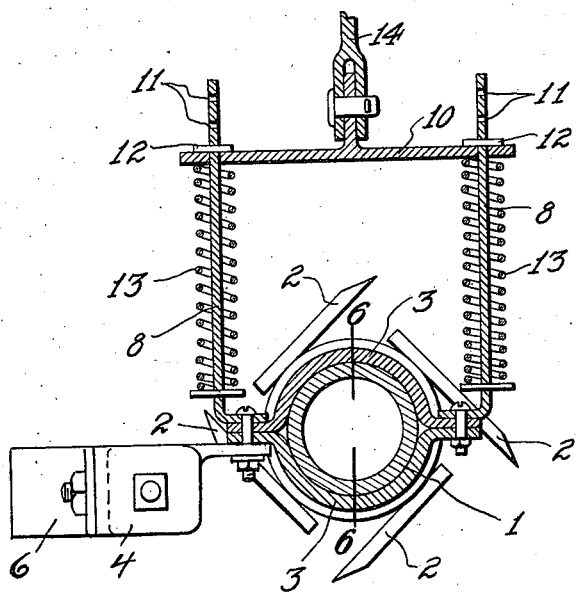
Figure 3 is a section on line 3—3 of Figure 2.

In these views 1 indicates a hollow bar to which are bolted the three sets of blades 2, one set being centrally arranged and the other two sets being secured to the end portions of the bar. Spaces are left between the sets and a two-part bearing 3 is placed in each space, the two parts of the bearing being bolted together. The bearings are suitably secured to a frame 4 which consists of a bar having its ends bent and perforated to receive the bolts which connect the frame with the bearings, and a strap 6 which is secured to the bar and is curved to form a recess between itself and the bar to receive the part 7 of the planter or other implement. The frame is bolted to the part 7 as shown in Figure 1. A pair of upwardly extending arms 8 are connected with each bearing and a bracket 10 is slidably mounted on each pair of arms. The upper ends of these arms are provided with a plurality of holes 11 adapted to receive pins 12 for adjustably holding the brackets on the arms. Coil springs 13 are carried by said arms and their upper ends engage the brackets. Bars 14 are pivotally mounted at the outer ends of said brackets and have their inner ends bolted to the part 7 of the implement, said bars being provided with braces 15.

From the above it will be apparent that when the device is attached to a wheeled implement, such as a planter, by the frame 4 and by the bars 14, the knives or blades on the shaft will be pressed against the ground by the springs so that when the implement travels the bar 1 and the blades will be caused to revolve in the bearings and thus the blades will come in contact with the stalks and the like and chop the same into small pieces. When the blades come in contact with a rock or other obstruction the springs will yield so as to permit the device to pass over the same without damaging the parts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a frame having a socket therein for receiving a part of an implement, a pair of bearings pivotally supported in the frame, a shaft supported in the bearings, blades carried by the shaft, a pair of arms connected with each bearing, a bracket slidably mounted on each pair of arms, springs on the arms engaging the brackets, a pair of bars, each having one end pivotally connected with a bracket and means for connecting the other ends of said bars with the implement.

In testimony whereof I affix my signature.

OREAL D. PEDEN.